Figure 1:
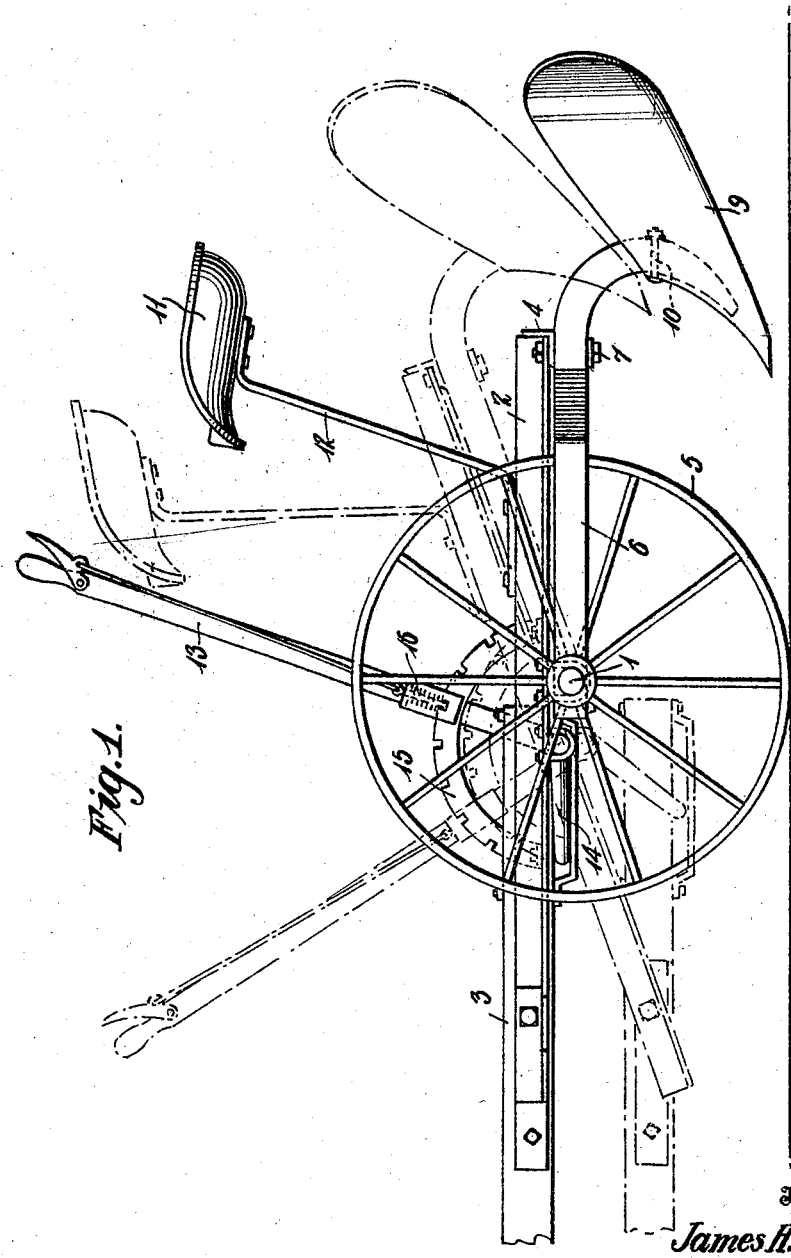

Jan. 13, 1925.

J. H. CAIRNS 1,523,048

FURROWER

Filed Nov. 13, 1922      2 Sheets-Sheet 1

Inventor
James H. Cairns
By Bacon & Thomas
Attorney

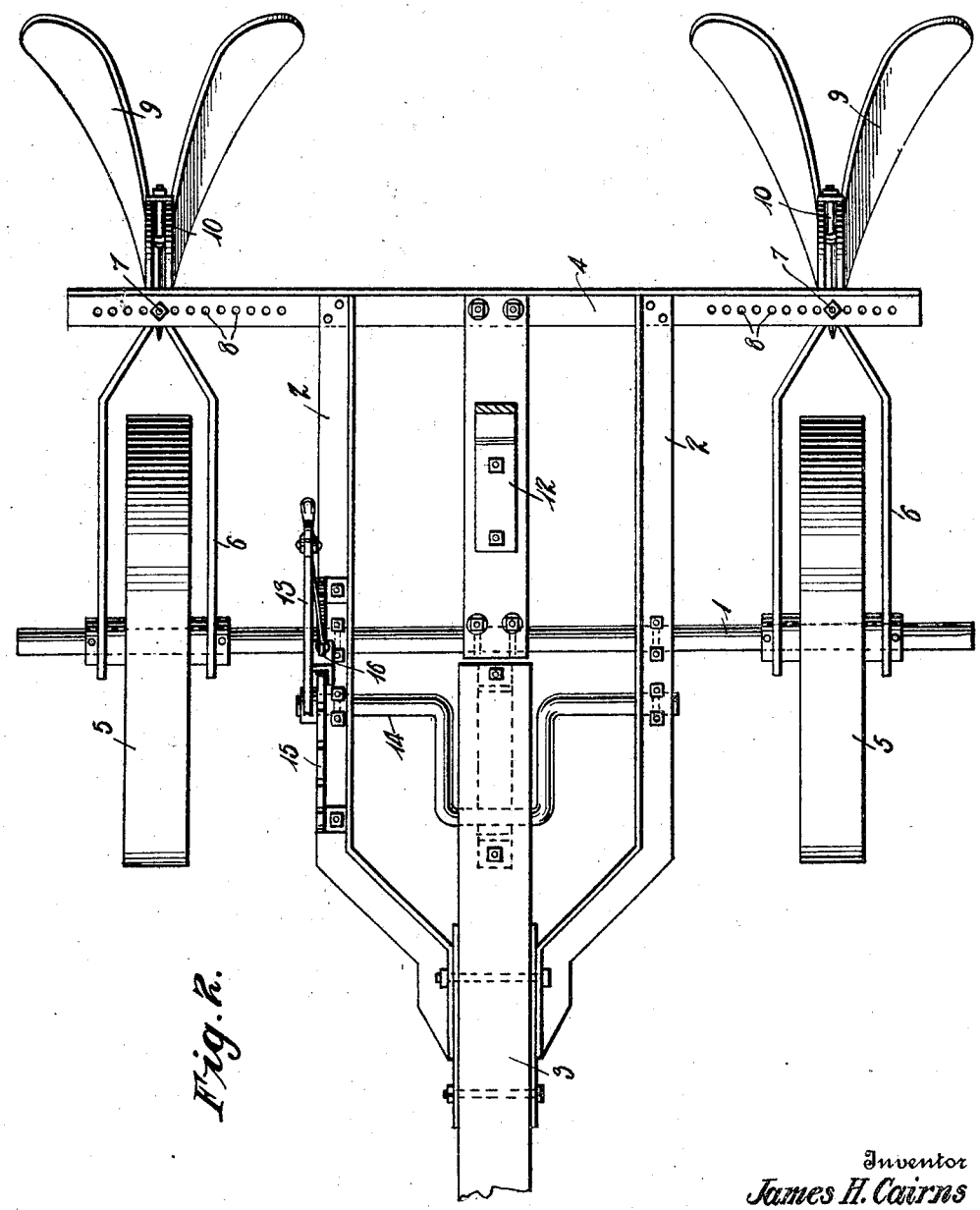

Patented Jan. 13, 1925.

1,523,048

UNITED STATES PATENT OFFICE.

JAMES H. CAIRNS, OF YERINGTON, NEVADA.

FURROWER.

Application filed November 13, 1922. Serial No. 600,505.

*To all whom it may concern:*

Be it known that I, JAMES H. CAIRNS, a citizen of the United States, residing at Yerington, in the county of Lyon and State of Nevada, have invented certain new and useful Improvements in Furrowers, of which the following is a specification.

The invention relates to improvements in a furrowing machine which is adapted to form irrigating furrows between different rows of vegetation, and to also properly position the earth adjacent the sides of the plant life.

The invention particularly relates to a furrowing machine of this character which is provided with flaring furrower shares adjustably mounted so as to be positioned in the most desirable places.

The invention further comprehends a machine of this character in which the furrow shares are not only adjustably mounted, but they are likewise so positioned that they may be lifted vertically from contact with the soil by the manipulation of an operating lever.
With this and other objects in view, the invention consists of a novel combination and arrangement of parts as hereinafter disclosed in the specification and drawings.

In the drawings Figure 1 represents a side elevation of the apparatus showing the furrows elevated in dotted lines; and, Figure 2 represents a top plan view of the apparatus.

Referring now more particularly to the drawings wherein like reference characters indicate corresponding parts, the furrowing machine is disclosed as having a central axle 1 upon which the angular side frames 2 are mounted. A central tongue 3 is connected to the forward end of said side frames as the apparatus herein shown is one of the horse drawn type, although it will be definitely understood that a motor driven furrower may be employed when desirable.
The rear ends of the side frames 2 are connected by a lateral rear bar 4, the same preferably being of an angular formation.

The axle 1 and the rear bar 4 are generally co-extensive, the axle receiving a pair of supporting wheels 5 which are slidably mounted thereon so as to adjust the tread of the apparatus. These wheels 5 are received within yokes 6, said yokes extending rearwardly and being adapted to be secured to the rear bar 4 by means of the fastening elements 7 which cooperate therewith and which pass through the apertures 8 disposed in rows at each side of said rear bar. The yokes have extended portions which are slightly curved and to which the furrow shares 9 are attached by the bolts 10. These shares are constructed so as to have the diverging sides form a proper irrigating furrow and to throw the earth properly around two adjacent rows of plants, vegetables and the like.

To laterally adjust the furrow shares 9 it is only necessary to remove the bolt and nuts 7 whereupon the yoke 6 together with the wheel 5 and the furrows carried thereby may be adjusted laterally and retained in position by any one of the separated apertures 8. This permits of a ready adjustment of the furrow shares whereby the apparatus may be used irrespective of the distance between adjacent furrows.

The machine is provided with an operator's seat 11, attached to a seat support 12 suspended on the axle 1 and the rear frame bar 4, which seat is positioned adjacent a lever 13 that is connected to a crank arm 14 journaled in the side frames 2 and coacting with the central tongue 3. The side frames 2 are pivotally connected to the tongue 3 and are also pivotally mounted on the axle 1 so that when the lever 13 is moved over the quadrant 15 away from the operator's seat, this causes a lifting of the side frame 2 with the end bar 4 elevating the furrows 9 from contact with the soil as clearly shown by the dotted lines in Figure 1. The furrows can be maintained in this position by reason of the latch 16 having a detent which cooperates with notches in said curved segment 15.

From the foregoing description it will be seen that the machine is one wherein the furrow shares are adjustable with the wheels of the device laterally so that various fields can be cultivated with but the use of a single machine, and that the furrow shares are furthermore mounted for a vertical adjustment. The machine may be either horse drawn or motor driven, or, of course, can be towed to any of the well known tractors.

Having thus described my invention, what I claim is:

1. A furrow marker, comprising a frame member, an axle therefor and laterally adjustable supporting wheels on said axle, a rear transverse bar permanently united to said frame, adjustable yoke means projecting from said axle adjacent each wheel and adjustable with said wheels in a lateral plane, furrow forming members carried by said adjustable means, and instrumentalities cooperating with said adjustable means and said transverse rear bar to hold said adjustable means with said wheels and furrow forming members connected therewith in different lateral positions of adjustment.

2. A furrow marker, comprising a frame, an axle for said frame extending substantially beyond the same at each side thereof, wheels slidably mounted on said axle ends, yokes coacting with said axle ends and adjustable with said wheels in a lateral plane, furrow forming means carried by said yokes, a transverse rear bar connected with said frame, and means to hold the yokes in different lateral positions of adjustment.

In testimony whereof I affix my signature.

JAMES H. CAIRNS.